United States Patent
Xie et al.

(10) Patent No.: US 11,038,682 B2
(45) Date of Patent: Jun. 15, 2021

(54) COMMUNICATION METHOD, APPARATUS AND SYSTEM, ELECTRONIC DEVICE, AND COMPUTER READABLE STORAGE MEDIUM

(71) Applicant: CLOUDMINDS (SHANGHAI) ROBOTICS CO., LTD., Shanghai (CN)

(72) Inventors: Hui Xie, Shenzhen (CN); Jian Wang, Shenzhen (CN); Hongfu Pang, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 303 days.

(21) Appl. No.: 16/314,640

(22) PCT Filed: May 26, 2017

(86) PCT No.: PCT/CN2017/086193
§ 371 (c)(1),
(2) Date: Dec. 31, 2018

(87) PCT Pub. No.: WO2018/214165
PCT Pub. Date: Nov. 29, 2018

(65) Prior Publication Data
US 2019/0207762 A1 Jul. 4, 2019

(51) Int. Cl.
*H04L 9/12* (2006.01)
*H04L 7/10* (2006.01)
(Continued)

(52) U.S. Cl.
CPC .............. *H04L 9/30* (2013.01); *H04L 9/3239* (2013.01); *H04L 9/3247* (2013.01);
(Continued)

(58) Field of Classification Search
None
See application file for complete search history.

(56) References Cited

U.S. PATENT DOCUMENTS 10,735,397 B2 * 8/2020 Ronda ........................ H04L 9/08
2019/0089717 A1 * 3/2019 Dolev .................... H04L 9/0866
2020/0320528 A1 * 10/2020 Setty ...................... H04L 63/12

FOREIGN PATENT DOCUMENTS

CN    105701372 A    6/2016
WO    2015085393 A1    6/2015

OTHER PUBLICATIONS

FairAccess: a new Blockchain-based access control framework for the Internet of Things. Ouaddah. (Year: 2017).*

(Continued)

*Primary Examiner* — Venkat Perungavoor
(74) *Attorney, Agent, or Firm* — Tucker Ellis LLP

(57) ABSTRACT

The present disclosure relates to a communication method, apparatus and system, an electronic device, and a computer readable storage medium. The communication method includes: determining an accepting host to be connected; obtaining a public key and communication address information of the accepting host from a blockchain; generating to-be-verified information according to the public key of the accepting host and a private key of the initiating host; sending the to-be-verified information to the accepting host according to the communication address information; and sending a communication connection request to the accepting host according to the communication address information to establish a communication connection with the accepting host. By adoption of the present disclosure, the anti-risk and anti-attack capabilities of the communication system may be improved by the decentralized features and security features of the blockchain, and the communication security is improved.

11 Claims, 10 Drawing Sheets

(51) Int. Cl.
    *H04L 9/30*     (2006.01)
    *H04L 12/46*     (2006.01)
    *H04L 29/08*     (2006.01)
    *H04L 29/06*     (2006.01)
    *H04L 9/32*     (2006.01)
    *G06F 21/85*     (2013.01)

(52) U.S. Cl.
    CPC .......... *H04L 9/3268* (2013.01); *H04L 9/3271* (2013.01); *H04L 12/4641* (2013.01); *H04L 63/0272* (2013.01); *H04L 63/0823* (2013.01); *H04L 63/12* (2013.01); *H04L 67/141* (2013.01); *H04L 2209/38* (2013.01)

(56) References Cited

OTHER PUBLICATIONS

International Search Report from corresponding International Patent Application No. PCT/CN2017/086193, dated Feb. 24, 2018, 4 pages.
Baidu, "Interview with Raven: Daban Block Chain," Apr. 9, 2017, 18 pages (inclusive of English and Chinese versions).

\* cited by examiner

COMMUNICATION METHOD, APPARATUS AND SYSTEM, ELECTRONIC DEVICE, AND COMPUTER READABLE STORAGE MEDIUM

FIELD OF THE INVENTION

The present disclosure relates to the field of security technology, and in particular, to a communication method, apparatus and system, an electronic device, and a computer readable storage medium.

BACKGROUND OF THE INVENTION

An SDP (software defined perimeter) is a network security isolation framework that may be dynamically configured on demand, and is used for providing a configurable security logic perimeter for application and service owners, and networks and services to be protected are isolated from insecure network environments to protect them against various network attacks and replace the traditional physical isolation facilities or devices.

Referring to FIG. 1, which is a schematic diagram of an SDP system in the related art. The SDP system 100 includes a controller 101, an accepting host (AH) 102, and an initiating host (IH) 103.

The controller 101 is a centralized main control device used for performing host authentication and policy delivery, and determining which AHs and IHs may communicate with each other. The AH 102 is deployed in front of the network or service to be protected in a physical or logical guard manner, rejects all network connections and makes no connection response before the SPA authentication of the controller 101 is passed. The IH 101 is deployed on a terminal or an application that needs to access the service, and applies for accessible service information to the controller 101, and the IH 101 may not know or access any protected service before obtaining the approval of the controller.

In the related art, in the SDP system, the controller 101 controls an accessible service list of the IH, and information such as an IP address of the AH, connection parameters (for example, port number and the like). Since the controller 101 is a centralized device, it is exposed in the network, and the information such as the IP address thereof is public, so that the controller is vulnerable to network attacks, for example, DDoS (Distributed Denial of Service) attack and the like. If the controller 101 suffers the network attack, the entire communication system cannot operate normally, and the IH cannot perform any data access.

SUMMARY OF THE INVENTION

The objective of the present disclosure is to provide a communication method, apparatus and system, an electronic device, and a computer readable storage medium for solving the problems in the related art.

In order to achieve the above objective, in a first aspect, the present disclosure provides a communication method, applied to an initiating host, including:
determining an accepting host to be connected, wherein the accepting host is configured to be connected with a server that provides data access for providing data access protection for the server;
determining an accepting host to be connected, wherein the accepting host is configured to be connect with a server that provides data access for providing data access protection for the server;
obtaining a public key and communication address information of the accepting host from a blockchain;
generating to-be-verified information according to the public key of the accepting host and a private key of the initiating host;
sending the to-be-verified information to the accepting host according to the communication address information; and
sending a communication connection request to the accepting host according to the communication address information to establish a communication connection with the accepting host, wherein the communication connection is used by the initiating host to obtain data within the data access authority of the initiating host from the data subjected to the data access protection from the server.

In a second aspect, a communication method is provided, applied to an accepting host, wherein the accepting host is configured to be connected with a server that provides data access for providing data access protection for the server;
the method includes:
receiving to-be-verified information sent by an initiating host;
obtaining a public key of the initiating host from a blockchain;
verifying the to-be-verified information according to the public key of the initiating host and a private key of the accepting host; and
after the to-be-verified information passes the verification, receiving a communication connection request sent by the initiating host to establish a communication connection with the initiating host; and
controlling the initiating host to obtain data within the data access authority from the data subjected to the data access protection through the communication connection according to the data access authority of the initiating host stored in the blockchain.

In a third aspect, a communication apparatus is provided, applied to an initiating host, wherein the apparatus includes:
a determining module, configured to determine an accepting host to be connected, wherein the accepting host is configured to be connected with a server that provides data access for providing data access protection for the server;
a first information obtaining module, configured to obtain a public key and communication address information of the accepting host from a blockchain;
a verification information generation module, configured to generate to-be-verified information according to the public key of the accepting host and a private key of the initiating host;
a sending module, configured to send the to-be-verified information to the accepting host according to the communication address information; and
a first connection establishment module, configured to send a communication connection request to the accepting host according to the communication address information to establish a communication connection with the accepting host, wherein the communication connection is used by the terminal to obtain data within the data access authority of the initiating host from the data subjected to the data access protection from the server.

In a fourth aspect, a communication apparatus is provided, applied to an accepting host, wherein the accepting host is configured to be connected with a server that provides data access for providing data access protection for the server;

the apparatus includes:

a receiving module, configured to receive to-be-verified information sent by an initiating host;

a second information obtaining module, configured to receive a public key of the initiating host from a blockchain;

a verification module, configured to verify the to-be-verified information according to the public key of the initiating host and a private key of the accepting host;

a second connection establishment module configured to, after the to-be-verified information passes the verification, receive a communication connection request sent by the initiating host to establish a communication connection with the initiating host; and an access control module, configured to control the initiating host to obtain data within the data access authority from the data subjected to the data access protection through the communication connection according to the data access authority of the initiating host stored in the blockchain.

In a fifth aspect, a computer readable storage medium is provided, wherein a computer program is stored thereon, and the program implements the steps of the method of the first aspect described above when being executed by a processor.

In a sixth aspect, an electronic device is provided, including:

the computer readable storage medium in the fifth aspect described above; and one or more processors for executing the programs in the computer readable storage medium.

In a seventh aspect, a computer readable storage medium is provided, wherein a computer program is stored thereon, and the program implements the steps of the method of the second aspect described above when being executed by a processor.

In an eighth aspect, an electronic device is provided, including:

the computer readable storage medium in the seventh aspect described above; and one or more processors for executing the program in the computer readable storage medium.

In a ninth aspect, a communication system is provided, including:

the electronic device in the sixth aspect described above, serving as an initiating host; and the electronic device in the eighth aspect described above, serving as an accepting host;

wherein the data access authority and a public key of the initiating host, and communication address information and the public key of the accepting host are all stored in a blockchain.

Through the above technical solutions, the software defined perimeter (SDP) is implemented through the blockchain, and the data access authority and the public key of the IH, the communication address information and the public key of the AH and the like are stored in the blocks of the blockchain, therefore the anti-risk and anti-attack capabilities of the communication system may be improved by the decentralized features and security features (for example, being unchangeable, unforgeable and fully traceable or the like) of the blockchain, and the communication security is improved.

Other features and advantages of the present disclosure will be described in detail in the following detailed description.

BRIEF DESCRIPTION OF THE DRAWINGS

The drawings used for providing a further understanding of the present disclosure, constitute a part of the specification and are used for explaining the present disclosure together with the following detailed description, but do not constitute limitations to the present disclosure. In the drawings.

DETAILED DESCRIPTION OF THE EMBODIMENTS

The specific embodiments of the present disclosure will be described in detail below with reference to the drawings. It should be understood that the specific embodiments described herein are merely used for illustrating and explaining the present disclosure rather than limiting the present disclosure.

In the embodiment of the present disclosure, the SDP system is improved based on the blockchain technology to solve the problems in the related art.

Before the communication method, apparatus and system, the electronic device and the computer readable storage medium provided by the present disclosure are illustrated, the blockchain involved in various embodiments of the present disclosure are introduced at first. A blockchain is a decentralized distributed database system in which all nodes in a blockchain network participate in maintenance. It is composed of a series of data blocks generated on the basis of cryptography, and each data block is a block in the blockchain. According to the sequence of generation time, the blocks are linked together orderly to form a data chain, which is vividly called the blockchain. Some concepts of a blockchain network are introduced below.

Blockchain nodes: nodes in a blockchain network may be referred to blockchain nodes, wherein the blockchain network is based on a P2P (Peer to Peer) network, and each P2P network node participating in transaction and block storage, verification and forwarding is a node in a blockchain network.

User identity: the user identity in the blockchain is represented by a public key, and a private key corresponding to the public key is mastered by a user and is not published to the network. In some embodiments, the public key is hashed and encoded to become an "address", and the "address" is the account address, which represents the user and may be randomly published. There is no one-to-one corresponding relationship between the user identity and the blockchain node, and the user may use his own private key on any blockchain node.

Blockchain data writing: the blockchain node writes data to the blockchain by issuing a transaction to the blockchain network. The transaction contains a signature of the transaction by the user with his or her private key to verify the identity of the user. The transaction is recorded by a "miner" (the blockchain node executing the PoW consensus competition mechanism) in a generated new block, and then is published to the blockchain network, and is verified and accepted by other blockchain nodes, and the transaction data are written in the blockchain.

Figure 1:
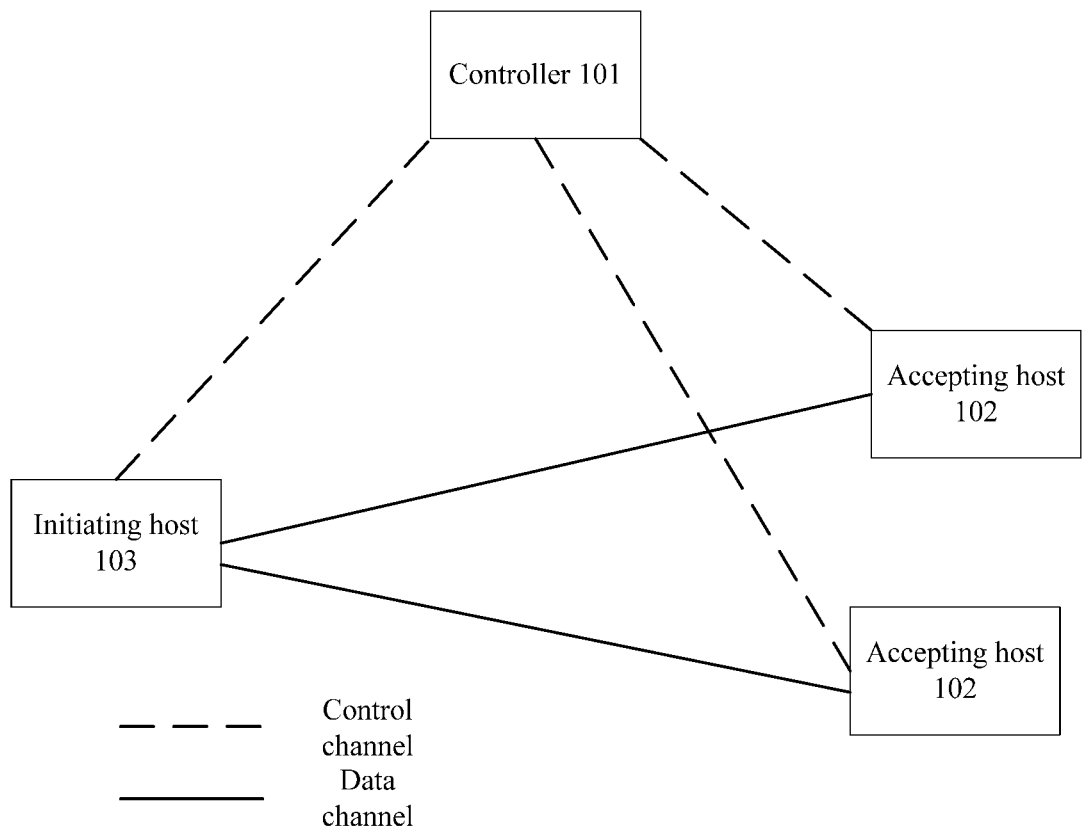
FIG. 1 is a block diagram of an SDP system in the related art.
Figure 2:
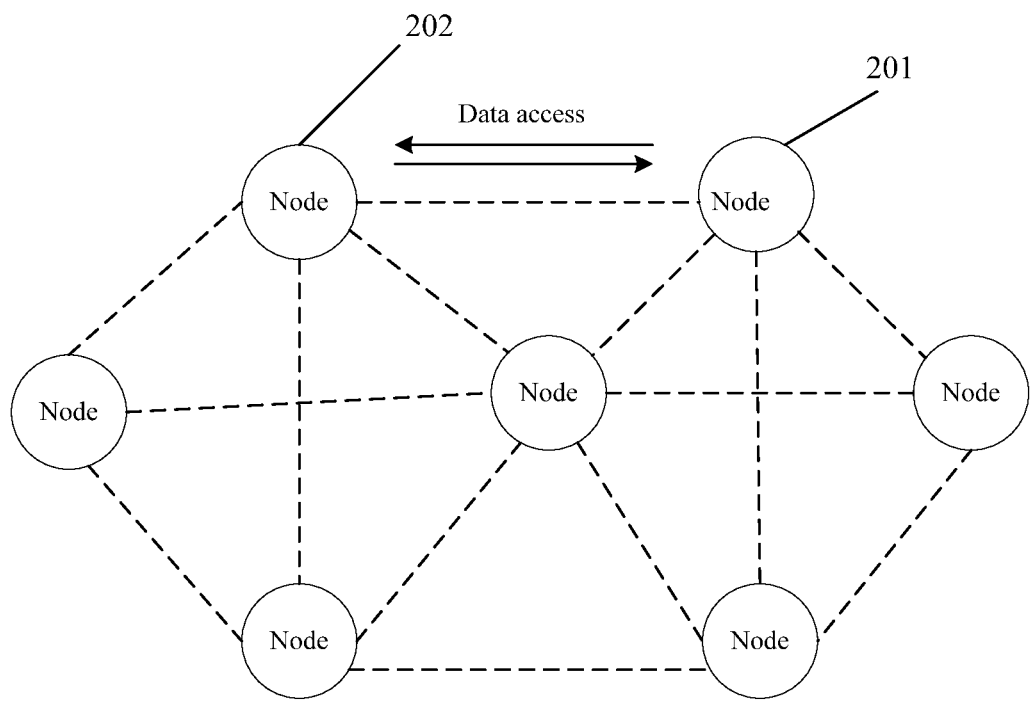
FIG. 2 is a schematic diagram of a communication system in an embodiment of the present disclosure.

Referring to FIG. 2, a communication system of an exemplary embodiment of the present disclosure includes a plurality of blockchain nodes. Both of an accepting host 201 and an initiating host 202 are nodes in the plurality of blockchain nodes. The accepting host 201 is arranged in front of a server that requires data access protection and is connected with the server. The "connection" herein may be a physical connection or a communication connection. The initiating host 202 is a client that initiates a connection or a data access request, and may be a mobile phone, a smart phone, a notebook computer, a digital broadcast receiver, a PDA (Personal Digital Assistant), a PAD (tablet computer), a PMP (Portable Multimedia Player), a navigation apparatus or other electronic device.

It should be understood that a P2P (point to point) connection may be established between the accepting host 201 and the initiating host 202 serving as the blockchain nodes, or the P2P connection may not be established. The number of the accepting host(s) 201 and the initiating host(s) 202 may be arbitrary, and this is not limited in the present disclosure.

According to the following embodiments of the present disclosure, a communication connection, for example, a VPN connection, is established between the accepting host 201 and the initiating host 202, so that they may perform a secure data access channel, and the initiating host 202 may perform data access from a server connected with the accepting host 201.

Figure 3:
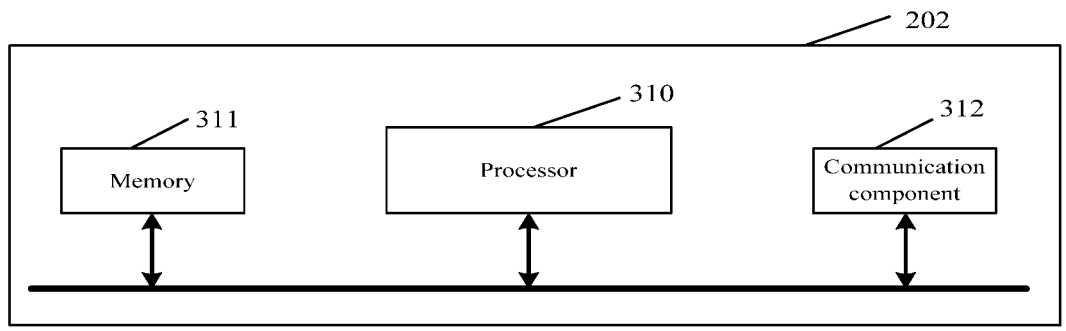
FIG. 3 is a structural schematic diagram of an initiating host in an embodiment of the present disclosure.

Referring to FIG. 3, in an embodiment of the present disclosure, the initiating host 202 at least includes a processor 310, a memory 311 and a communication component 312. The memory 311 is used for storing operating systems and various types of data to support the operations at the initiating host 202, for example, these data may include the instructions used for operating any application program or method on the initiating host 202, and data related to the application program.

In some embodiments, the memory 311 also stores a complete blockchain or a block header that stores a blockchain.

The processor 310 is used for controlling the overall operation of the initiating host 202 and performing information processing, and the like. In an embodiment of the present disclosure, the processor 310 may control the operation of a smart contract in a block in the blockchain.

In an embodiment, device information, authority information and the like are stored in the smart contract. Wherein, the device information includes: a public key of the initiating host, the data access authority of the initiating host, communication address information of the accepting host (for example, an IP address, a port number, and the like), a public key of the accepting host, and the like. The authority information includes: account information of a blockchain account and the authority corresponding to the account. The authority includes: reading authority of the foregoing device information, modification authority of the foregoing device information, replacement authority of the foregoing device information, deletion authority of the foregoing device information, and other change authority. The account information may be an account address or an account name or the like. The account address is the "address" converted from the public key, and the account name may be a device name, a device serial number, and the like.

The communication component 312 is used for performing wired or wireless communication between the initiating host 202 and other devices. The wireless communication is, such as Wi-Fi, Bluetooth, near field communication (abbreviated as NFC), 2G, 3G, 4G or 5G, or a combination of one or more of them, so that the corresponding communication component 312 may include: a Wi-Fi module, a Bluetooth module, an NFC module, a 2G module, a 3G module, a 4G module or a 5G module, or a combination of one or more of them.

In an embodiment of the present disclosure, the initiating host 202 may establish the communication connection with the accepting host 201 via the communication component 312.

In addition, the initiating host 202 may also include a multimedia component (e.g., a touch screen, a microphone, a loudspeaker or the like) and an input/output interface and the like so as to implement corresponding functions.

Figure 4:
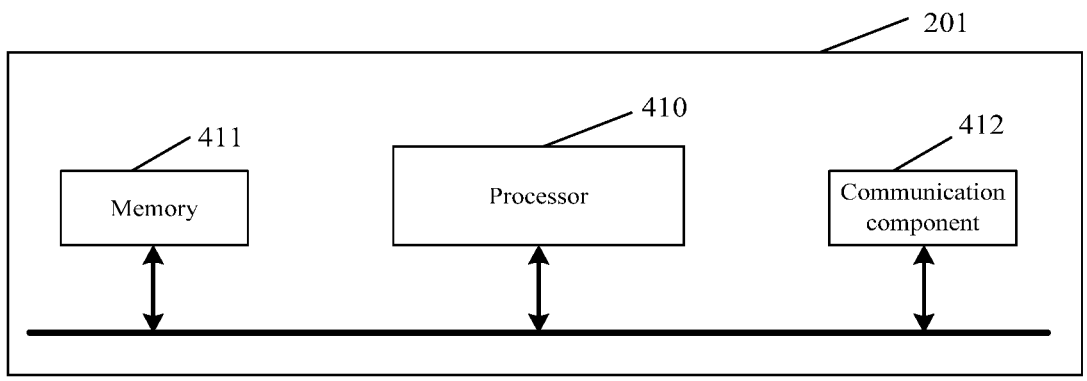
FIG. 4 is a structural schematic diagram of an accepting host in an embodiment of the present disclosure.

Referring to FIG. 4, it is a structural schematic diagram of the accepting host 201 in an embodiment of the present disclosure. The accepting host 201 includes a processor 410, a memory 411, a communication component 412, and the like. The functions of the processor 410, the memory 411 and the communication component 412 are similar to those of the foregoing processor 310, memory 411 and communication component 412, and are not repeated herein. In an embodiment, since the accepting host 201 is configured to be connected with a server that provides data access for providing data access protection for the server. It should be understood that the accepting host 201 may be arranged in a network device such as a gateway, a router or the like, or directly arranged in the server, or exists as an independent device. When the accepting host 201 is arranged in the device comprising the processor, the memory and the communication component, such as the gateway, the router, the server or the like, the functions of the accepting host 201 may be implemented by a corresponding module of the device where it is located.

It should be understood that the initiating host 202 and the accepting host 201 may also be not blockchain nodes, but are in communication connection with the blockchain nodes so as to obtain corresponding information from the blockchain nodes and implement corresponding functions.

In an embodiment of the present disclosure, the controller function of the software defined perimeter (SDP) is implemented based on the blockchain, an accessible service list (i.e., the data access authority of the initiating host 202) and the public key of the IH (initiating host), and the communication address information (for example, the IP address, the port number and the like) and the public key of the AH (accepting host) are stored in the blockchain, therefore, the anti-risk and anti-attack capabilities of the communication system may be improved by the decentralized features and security features (for example, being unchangeable, unforgeable and fully traceable or the like) of the blockchain, and the communication security is improved.

On the other hand, the process of the initiating host and the accepting host to interact with the controller to obtain device information, and registration, authentication and other processes are omitted, and the communication efficiency and performance of the device are improved.

In an embodiment of the present disclosure, the storage of related information of the initiating host and the accepting host may be implemented in the form of the smart contract.

Figure 5:
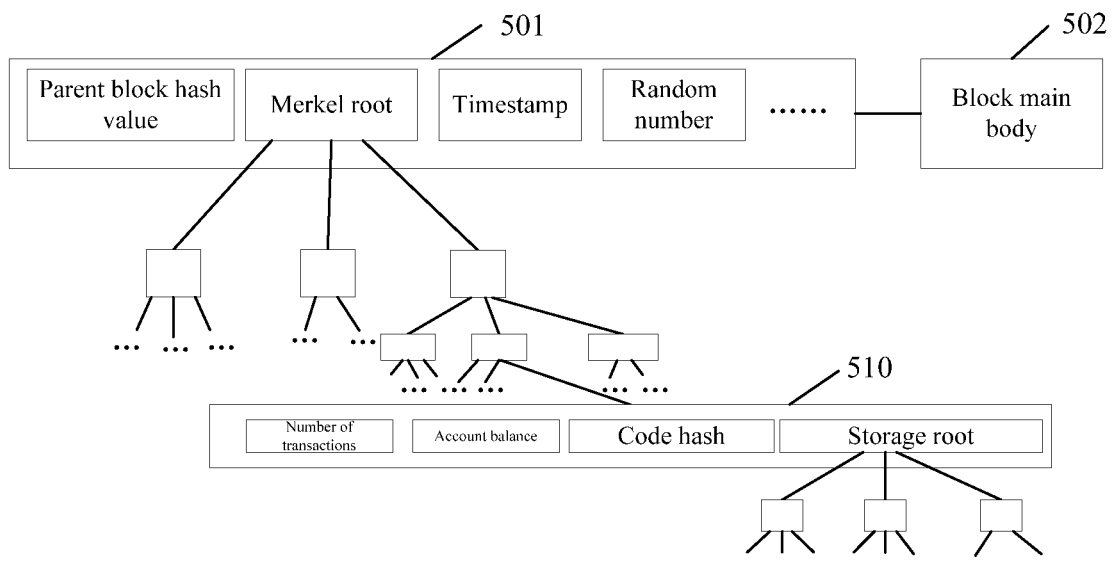
FIG. 5 is a schematic diagram of a data structure of a block in a blockchain in an embodiment of the present disclosure.

Referring to FIG. 5, it is a schematic diagram of a data structure of a block in a blockchain in an embodiment of the present disclosure. The block 500 in the blockchain includes a block header 501 and a block main body 502. The block main body 502 records all transaction information within the previous period of time. The block header 501 includes: a parent block hash value, a Merkel root, a timestamp, a random number and other fields.

The value of the Merkel root is obtained by performing hash on the data stored on the entire tree. A leaf node using the Merkel root as a root node is used for storing the account information.

Referring to FIG. 5, the leaf node 510 is an account node storing the account information, and each account node includes: a transaction number field, an account balance field, a code hash field, a storage root field, and the like. Wherein, the transaction number field is used for recording the number of transactions initiated from the account. The account balance field is used for recording the account balance of the account. The code hash field is used for recording the code hash of the smart contract and pointing to a contract code. If the account is not a contract account, the code hash field is empty. A storage root field is the root node of another tree, and the tree is an internal data storage space of the smart contract account.

The smart contract may be deployed on the blockchain by the blockchain node that is bound with a contract account, and the deployed smart contract has its own address on the blockchain. The deployment process of the smart contract is a process in which the blockchain node writes a compiled smart contract byte code into a block on the blockchain in the form of publishing the transaction. Referring to FIG. 5 and foregoing description, after the smart contract is deployed, it is stored in the corresponding block, and the address of the block storing the smart contract is the "own address" of the foregoing smart contract on the blockchain.

In the embodiment of the present disclosure, the foregoing device information, the authority information and the like are stored in the smart contract. When the initiating host (or the accepting host) is the node in the blockchain and storing the complete blockchain or the block header, the initiating host (or the accepting host) can activate the smart contract through time or event driving (for example, executing a corresponding instruction message) after determining the storage block of the smart contract (for example, determining the storage block of the smart contract in a query mode), thereby to read the related information stored in the smart contract.

In an embodiment, an administrator account may be set up to maintain and modify the information of the initiating host and the accepting host, and deploy the smart contract.

In an embodiment of the present disclosure, the information stored in the smart contract may be changed, for example, modified, replaced, deleted or the like. The change to the data in the smart contract is implemented in the form of "transaction". As previously mentioned, the authority information is stored in the smart contract, and only the account with the corresponding authority may change the information stored in the smart contract.

The reading authority control of the smart contract may be implemented in the following manner: when the blockchain account requests to read the information stored in the smart contract, a signature is provided. The signature may be verified in the smart contract, and only when the verification is passed, the smart contract is executed to return corresponding information.

At the same time, a private chain or a license chain can also be used as a blockchain base platform of the smart contract in a superposition manner to further improve the control of the reading authority. That is, only the node bound with the licensed or authenticated account may form the blockchain network so as to form the private chain or the license chain, thereby further ensuring the security of the information stored in the smart contract and improving the network security.

In addition, in another embodiment of the present disclosure, the storage of the related information of the initiating host and the accepting host may be implemented not by means of the smart contract, but is implemented directly by publishing a transaction-generating a new block.

Figure 6:
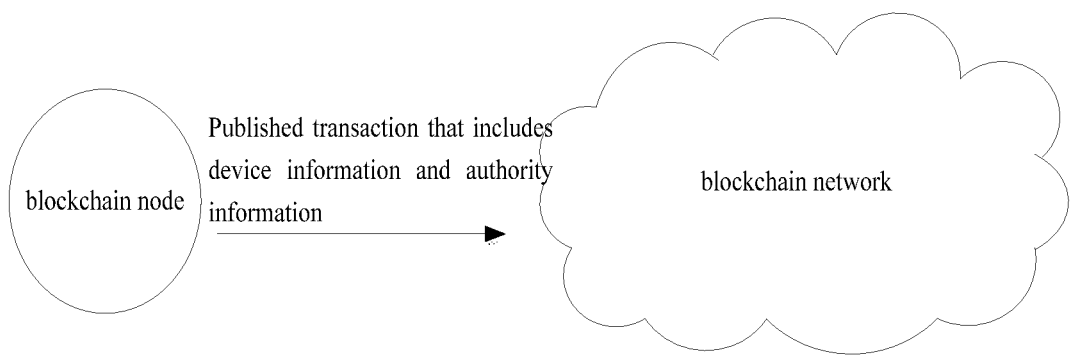
FIG. 6 is a schematic diagram of information storage by publishing transactions in an embodiment of the present disclosure.

Referring to FIG. 6, a blockchain node 110 publishes a transaction to the blockchain network, and the transaction includes: the above-mentioned device information and the authority information, and the like. When the transaction including the device information and the authority information published by the blockchain node 110 is written to the block by the "miner", the related information of the initiating host and the accepting host is stored in a block of the blockchain.

Further, since the authority information is stored in the blockchain, the authority control can be performed on the reading and writing of the information. The control of the reading and writing authority can be implemented according to the authority information, for example, when a reading request of an account on the device information is received, whether the account has the authority of reading the device information is determined according to the corresponding relationship in the authority information; and only when the account has the authority of reading the device information, the related device information is returned or output. A "writing" operation of replacing, deleting and modifying the device information may also be performed in a similar manner.

Figure 7:
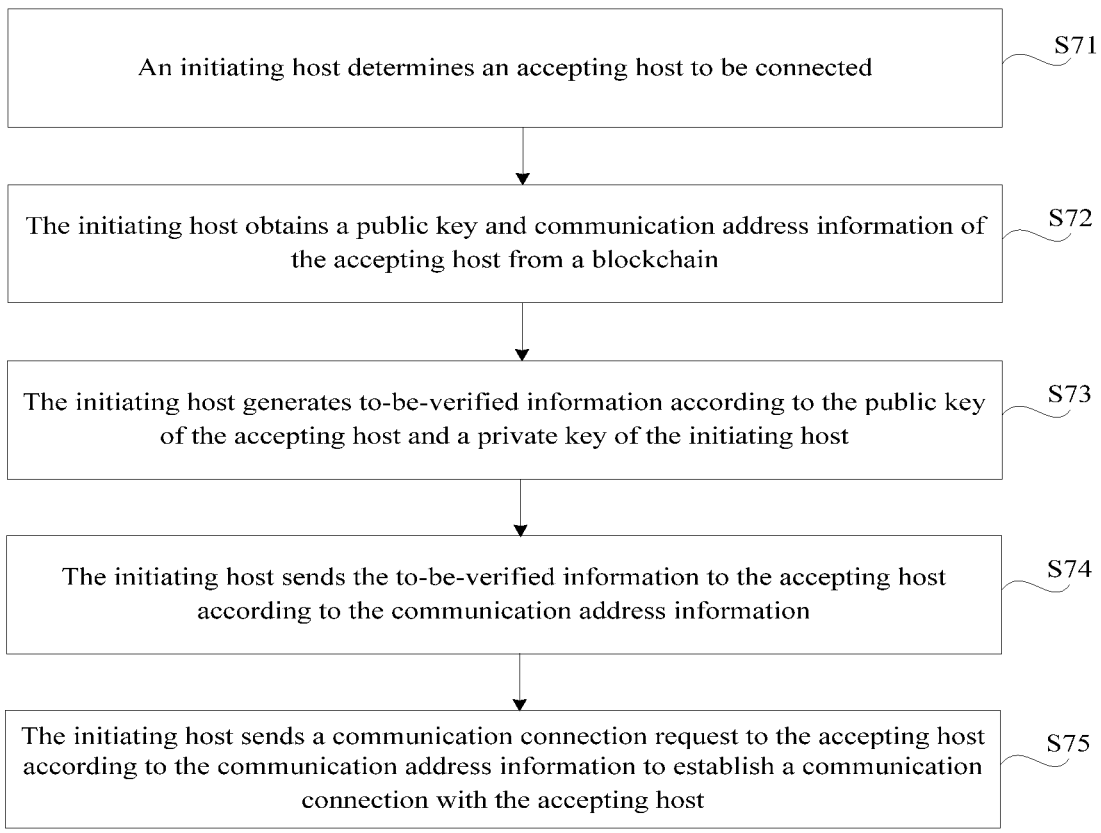
FIG. 7 is a schematic flow diagram of a communication method applied to an initiating host in an embodiment of the present disclosure.

Based on the blockchain storing the device information and the authority information of the initiating host and the accepting host, referring to FIG. 7, in an embodiment of the present disclosure, the accepting host 201 and the initiating host 202 perform communication by using the following communication method:

In step S71, the initiating host determines the accepting host to be connected.

The initiating host may select one or more accepting hosts to perform data access and may determine an accepting host to be connected according to the data access requirements thereof.

In step S72, the initiating host obtains a public key and communication address information of the accepting host from a blockchain. The blockchain is the blockchain storing the device information and/or the authority information as described above.

When the initiating host is not the node in the blockchain, the initiating host may communicate with the blockchain node to request to obtain the public key of the accepting host from the blockchain node. When the blockchain uses the smart contract to store the device information and/or the authority information, and when the initiating host is the blockchain node and stores a complete blockchain or only stores a block header, the initiating host may directly obtain the public key of the accepting host from the blockchain. When the blockchain adopts the manner of directly storing the device information and/or the authority information in the block, if the initiating host is the blockchain node and stores the complete blockchain, the initiating host may directly obtain the public key of the accepting host from the blockchain; and if the initiating host is the blockchain node and only stores the block header (for example, the initiating host is a light node), the initiating host may communicate with all nodes in the blockchain to request to obtain the public key of the accepting host.

In step S73, the initiating host generates to-be-verified information according to the public key of the accepting host and a private key of the initiating host.

In an embodiment, a first share secret is obtained according to the public key of the accepting host and the private key of the initiating host; and the to-be-verified information is generated according to the first share secret.

In step S74, the initiating host sends the to-be-verified information to the accepting host according to the communication address information.

In an embodiment, the communication address information of the accepting host is obtained from the blockchain; and the to-be-verified information is sent to the accepting host according to the communication address information.

In step S75, a communication connection request is sent to the accepting host according to the communication address information to establish a communication connection with the accepting host after the to-be-verified information passes the verification of the accepting host. The communication connection is used by the initiating host to obtain data within the data access authority of the initiating host from the data subjected to the data access protection from the server.

It needs to be noted that, although the situation in which the to-be-verified information and the communication connection request are sent in different steps is described in the present embodiment, in actual application, "sending the to-be-verified information to the accepting host according to the communication address information" and "sending the communication connection request to the accepting host according to the communication address information" may also be performed in the same step, for example, the to-be-verified information is carried in the communication connection request to be sent to the accepting host together, and the accepting host firstly verifies the to-be-verified information after receiving the communication connection request and performs a corresponding connection process after the verification is passed. The corresponding technical solutions should also fall within the scope of protection of the present disclosure.

Figure 8:
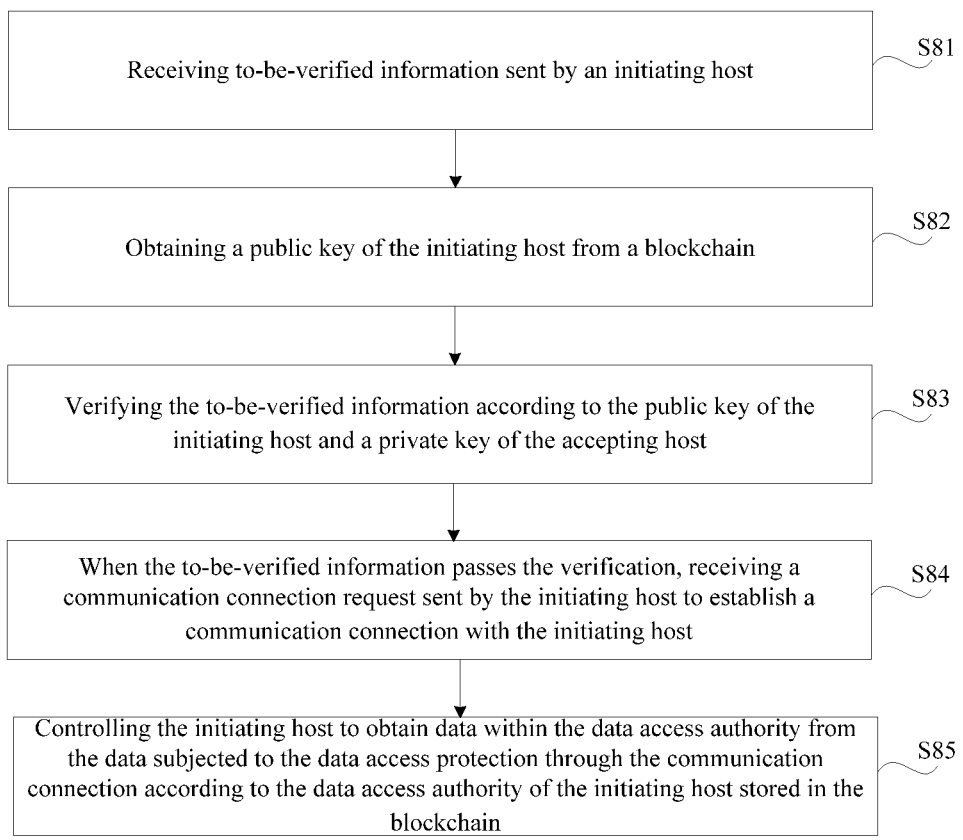
FIG. 8 is a schematic flow diagram of a communication method applied to an accepting host in an embodiment of the present disclosure.

Referring to FIG. 8, on an accepting host side:

In step S81, the to-be-verified information sent by the initiating host is received.

In step S82, the public key of the initiating host is obtained from the blockchain.

In step S83, the to-be-verified information is verified according to the public key of the initiating host and the private key of the accepting host.

In step S84, after the to-be-verified information passes the verification, the communication connection request sent by the initiating host is received to establish the communication connection with the initiating host.

In step S85, according to the data access authority of the initiating host stored in the blockchain, the initiating host is controlled to obtain the data within the data access authority from the data subjected to the data access protection through the communication connection.

Figure 9:
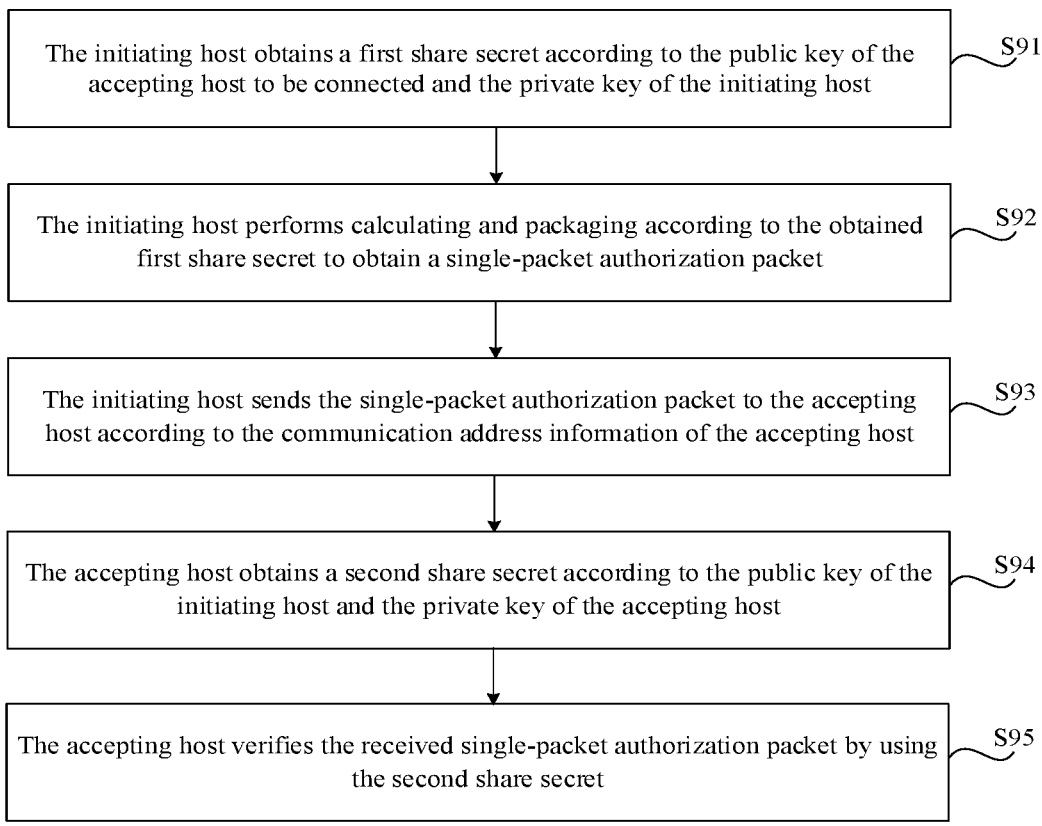
FIG. 9 is a schematic diagram of verification flow in an embodiment of the present disclosure.

Referring to FIG. 9, in an embodiment of the present disclosure, the verification process of the step S73 and the step S83 includes:

In step S91, the initiating host obtains a first share secret according to the public key of the accepting host to be connected and the private key of the initiating host.

In an embodiment, the first share secret is obtained by using an elliptic curves cryptography (ECC) point multiplication mode, referring to equation (1).

$$\text{ShareSecret1} = \text{PrivateKeyIH} \cdot \text{PublicKeyAH} \qquad (1)$$

The ShareSecret1 is the first share secret, the PrivateKeyIH is the private key of the initiating host, the PublicKeyAH is the public key of the accepting host, and "·" represents the ECC point multiplication.

In step S92, the initiating host performs calculating and packaging according to the obtained first share secret to obtain a single-packet authorization packet (SPA packet). The single-packet authorization packet is the above-mentioned to-be-verified information. In some embodiments, the single-packet authorization packet may be obtained by an OTP (One Time Password) calculation method specified in the RFC4226.

In step S93, the initiating host sends the single-packet authorization packet to the accepting host according to the communication address information of the accepting host.

In step S94, the accepting host obtains a second share secret according to the public key of the initiating host and the private key of the accepting host.

Referring to equation (2), the second share secret is:

$$\text{ShareSecret2} = \text{PrivateKeyAH} \cdot \text{PublicKeyIH} \qquad (2)$$

The ShareSecret2 is the second share secret, the PrivateKeyAH is the private key of the accepting host, the PublicKeyIH is the public key of the initiating host, and "·" represents the ECC point multiplication.

In step S95, the accepting host verifies the received single-packet authorization packet by using the second share secret.

According to the characteristics of the ECC point multiplication, the first share secret and the second share secret are the same, that is, ShareSecret1 ShareSecret2. Thus, when the accepting host detects that the first share secret is the same as the second share secret, the accepting host determines that the received single-packet authorization packet is legal, and the verification is passed.

Therefore, by adoption of the embodiment of the present disclosure, the share secret between the initiating host and the accepting host does not need to be preset, but is generated by using the elliptic curves cryptography point multiplication mode, in this way, no complex operation and maintenance management of the preset share secret is required, thereby reducing the system operation and maintenance complexity and improving the system management efficiency.

In an embodiment of the present disclosure, after the verification of the accepting host on the to-be-verified information is passed, a virtual host network (VPN) connection may be established between the initiating host and the accepting host through handshake, key agreement, and the like.

In an embodiment of the present disclosure, the VPN between the initiating host and the accepting host may be implemented based on a preset VPN protocol, such as IPSec (Internet Protocol Security) VPN, Open VPN, and SSL (Secure Sockets Layer) VPN, etc.

Figure 10:
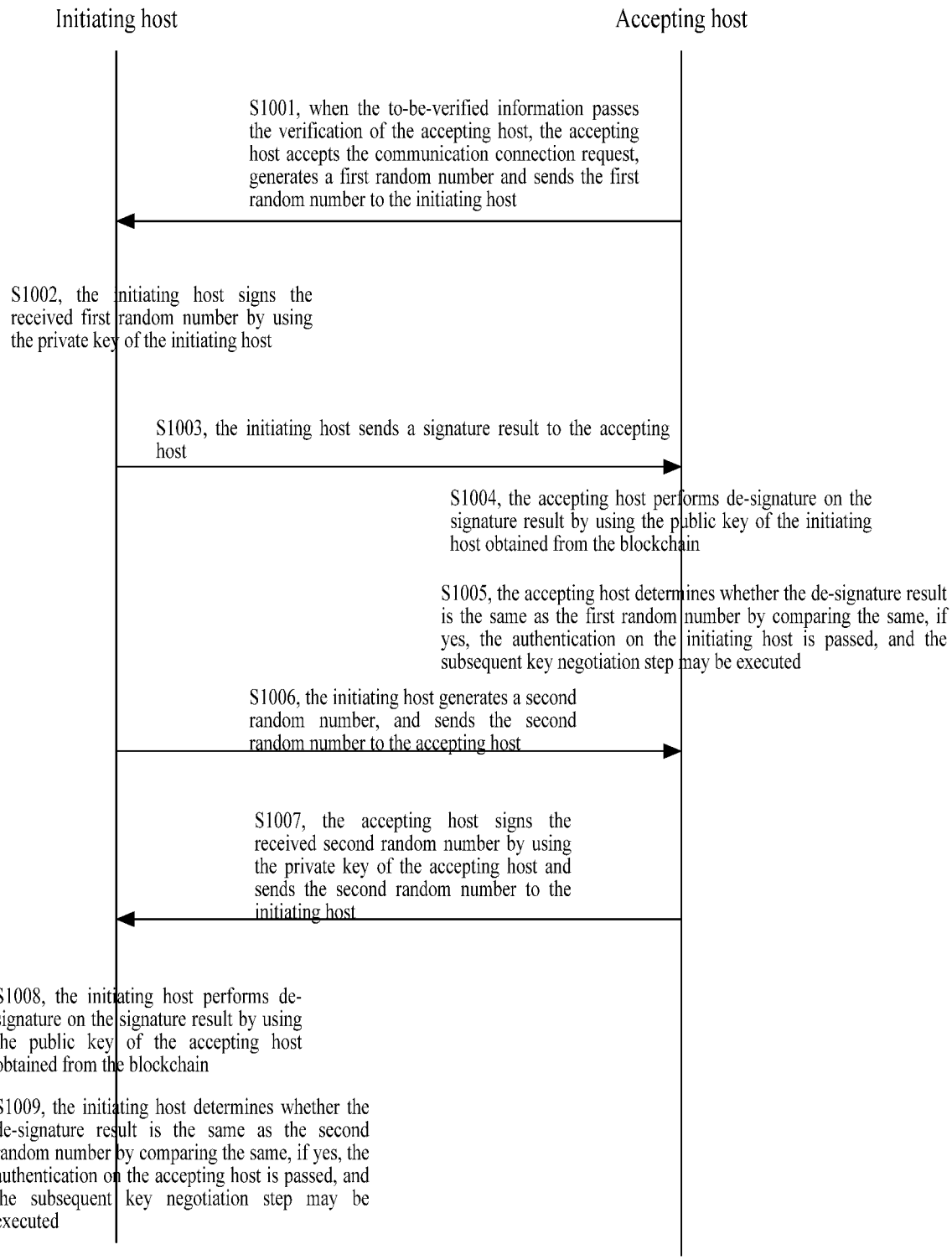
FIG. 10 is a schematic flow diagram of a handshake protocol in an embodiment of the present disclosure.

In the embodiment of the present disclosure, an authentication phase of a handshake protocol of the preset VPN protocol such as the IPSec, the VPN, the Open VPN, the SSL VPN and the like by performing two-way challenge authentication based on the public key of the initiating host and the public key of the accepting host recorded in the blockchain. Referring to FIG. 10, the handshake protocol of the embodiment of the present disclosure includes:

in step S1001, when the to-be-verified information passes the verification of the accepting host, the accepting host accepts the communication connection request, generates a first random number and sends the first random number to the initiating host;

in step S1002, the initiating host signs the received first random number by using the private key of the initiating host;

in step S1003, the initiating host sends a signature result to the accepting host;

in step S1004, the accepting host performs de-signature on the signature result by using the public key of the initiating host obtained from the blockchain;

in step S1005, the accepting host determines whether the de-signature result is the same as the first random number by comparing the same, if yes, the authentication on the initiating host is passed, and the subsequent key negotiation step may be executed;

On the other hand, in step S1006, the initiating host generates a second random number, and sends the second random number to the accepting host;

in step S1007, the accepting host signs the received second random number by using the private key of the accepting host and sends the signed second random number to the initiating host;

in step S1008, the initiating host performs de-signature on the signature result by using the public key of the accepting host obtained from the blockchain; and in step S1009, the initiating host determines whether the de-signature result is the same as the second random number by comparing the same, if yes, the authentication on the accepting host is passed, and the subsequent key negotiation step may be executed.

Thus, when the two-way verification of the accepting host and the initiating host is passed, a key agreement phase is performed. It should be understood that the key negotiation phase is a master key for negotiating data encryption, and the phase may be performed in a conventional manner and is not repeated herein. In the embodiment of the present disclosure, since the public key of the initiating host and the public key of the accepting host are stored in the blockchain, in the above authentication phase, the initiating host and the accepting host do not need to perform the process of exchanging and verifying the public key certificate, thereby improving the efficiency of the handshake process, and then the efficiency of the VPN connection is improved.

Figure 11:
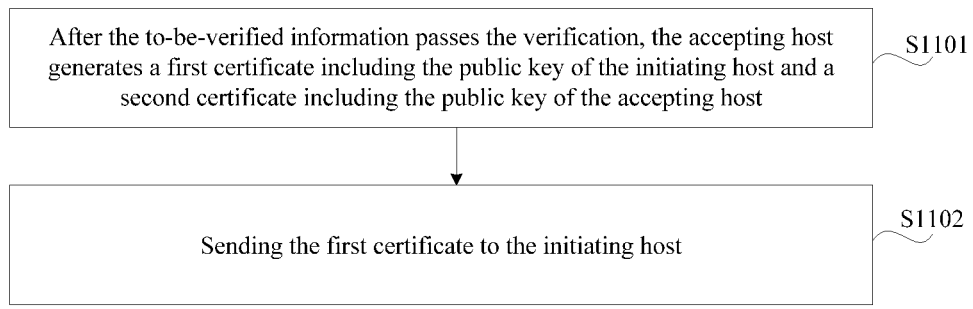
FIG. 11 is a schematic diagram of VPN connection flow between an initiating host and an accepting host in an embodiment of the present disclosure.

Referring to FIG. 11, in another embodiment of the present disclosure, the VPN connection between the initiating host and the accepting host may be implemented in the following manner:

In step S1101, after the to-be-verified information passes the verification, the accepting host generates a first certificate including the public key of the initiating host and a second certificate including the public key of the accepting host. The first certificate is used by the initiating host to prove its own identity when the VPN connection with the accepting host is established, and the second certificate is used by the accepting host to prove its own identity when the VPN connection with the initiating host is established. The public key of the initiating host is obtained by the accepting host from the blockchain. In the embodiment, the accepting host is provided with a certificate generation module used for generating the certificate including the public key of the initiating host. In some embodiments, the initiating host may also temporarily generate a group of public keys and private keys and send the public key to the accepting host, and the accepting host generates the first certificate according to the public key so as to implement the subsequent identity verification In step S1102, the first certificate is sent to the initiating host.

Therefore, when the initiating host and the accepting host perform the handshake protocol, the certificate generated by the accepting host may be used, the initiating host may send its own first certificate to the accepting host, and the accepting host verifies the first certificate, similarly, the accepting host may send its own second certificate to the initiating host, and the initiating host verifies the second certificate. Therefore, the generation and release of the certificates do not rely on a trusted third party, so that the efficiency of the system can be improved.

If a plurality of accepting hosts exist, the initiating host needs to obtain different certificates from the corresponding accepting hosts when accessing different accepting hosts, and use the certificates to establish the VPN connections with the corresponding accepting hosts.

After the VPN connection is established between the initiating host and the accepting host, the accepting host allows the initiating host to access resources within the authority according to the access authority of the initiating host stored in the blockchain.

According to the communication method of the embodiment of the present disclosure, the anti-risk and anti-attack capabilities of the communication system may be improved by the decentralized features and security features (for example, being unchangeable, unforgeable and fully traceable or the like) of the blockchain, and the communication security is improved. On the other hand, the process of the initiating host and the accepting host interacting with the controller to obtain device information, and registration, authentication and other processes are omitted, and the communication efficiency and performance of the device are improved. Furthermore, the share secret between the initiating host and the accepting host does not need to be preset, but is generated by using the elliptic curves cryptography point multiplication mode, in this way, no complex operation and maintenance management of the preset share secret is required, thereby improving the system management efficiency.

Figure 12:
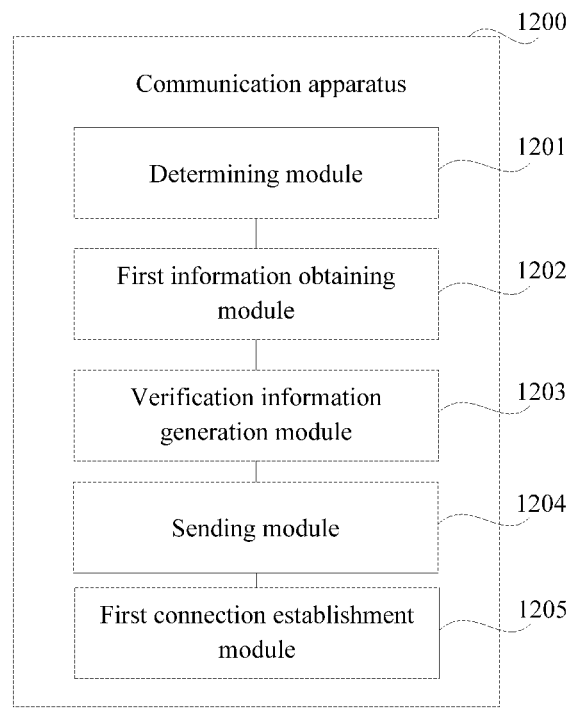
FIG. 12 is a block diagram of a communication apparatus in an embodiment of the present disclosure.

Referring to FIG. 12, the embodiment of the present disclosure further provides a communication apparatus, applied to an initiating host, and the apparatus 1200 includes:

a determining module 1201, configured to determine an accepting host to be connected, wherein the accepting host is configured to be connected with a server that provides data access for providing data access protection for the server;

a first information obtaining module 1202, configured to obtain a public key and communication address information of the accepting host from a blockchain;

a verification information generation module 1203, configured to generate to-be-verified information according to the public key of the accepting host and a private key of the initiating host;

a sending module 1204, configured to send the to-be-verified information to the accepting host according to the communication address information; and a first connection establishment module 1205, configured to send a communication connection request to the accepting host according to the communication address information to establish a communication connection with the accepting host, wherein the communication connection is used by the initiating host to obtain data within the data access authority of the initiating host from the data subjected to the data access protection from the server.

Figure 13:
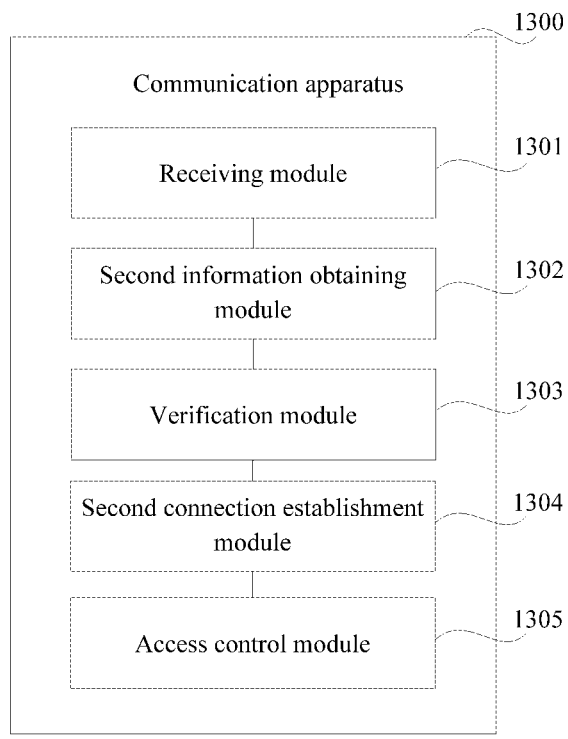
FIG. 13 is a block diagram of a communication apparatus in another embodiment of the present disclosure.

Referring to FIG. 13, the embodiment of the present disclosure further provides a communication apparatus, applied to an accepting host, wherein the receiving host is configured to be connected with a server that provides data access for providing data access protection for the server; the apparatus 1300 includes:

a receiving module 1301, configured to receive to-be-verified information sent by an initiating host;

a second information obtaining module 1302, configured to obtain a public key of the initiating host from a blockchain;

a verification module 1303, configured to verify the to-be-verified information according to the public key of the initiating host and a private key of the accepting host;

a second connection establishment module 1304 configured to, when the to-be-verified information passes the verification, receive a communication connection request sent by the initiating host to establish a communication connection with the initiating host; and an access control module 1305, configured to control the initiating host to obtain data within the data access authority from the data subjected to the data access protection through the communication connection according to the data access authority of the initiating host stored in the blockchain.

With regard to the device in the above embodiments, the specific manners in which the respective modules perform the operations have been described in detail in the embodiments relating to the method, and will not be explained in detail herein.

The embodiment of the present disclosure further provides a computer readable storage medium, wherein a computer program is stored thereon, and the program implements the steps of the communication method applied to the initiating host when being executed by a processor.

The embodiment of the present disclosure further provides an electronic device, including: the computer readable storage medium for implementing the communication method applied to the initiating host; and one or more processors for executing the programs in the computer readable storage medium.

The embodiment of the present disclosure further provides a computer readable storage medium, wherein a computer program is stored thereon, and the program implements the steps of the communication method applied to the accepting host when being executed by a processor.

The embodiment of the present disclosure further provides an electronic device, including: the computer readable storage medium for implementing the communication method applied to the accepting host; and one or more processors for executing the programs in the computer readable storage medium.

Figure 14:
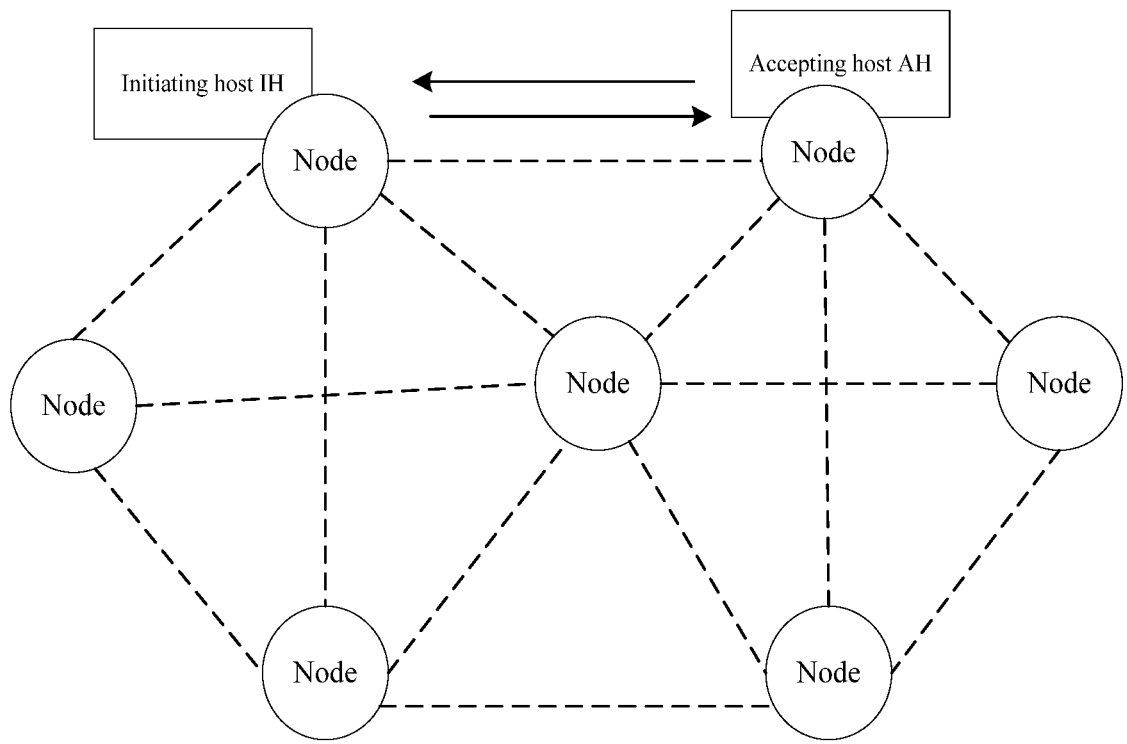
FIG. 14 is a schematic diagram of a communication apparatus in yet another embodiment of the present disclosure.

Correspondingly, referring to FIG. 14, the embodiment of the present disclosure further discloses a communication system, including:

the initiating host serving as the initiating host; and
the accepting host serving as the accepting host;
wherein the data access authority and the public key of the initiating host, and communication address information and the public key of the accepting host are all stored in a blockchain.

In an embodiment, the initiating host is used for obtaining the public key of the accepting host from the blockchain, obtaining a first share secret according to the private key of the initiating host and the public key of the accepting host, and generating to-be-verified information according to the first share secret; and the accepting host is used for obtaining the public key of the initiating host from the blockchain, obtaining a second share secret according to the private key of the accepting host and the public key of the initiating host, and verifying the to-be-verified information by using the second share secret.

In an embodiment, the blockchain includes a first block storing a smart contract;

the smart contract stores the data access authority and the public key of the initiating host, and the communication address information and the public key of the accepting host; and the first block is created by a first blockchain node in a manner of publishing a transaction including the smart contract.

In an embodiment, the blockchain includes a second block for storing the data access authority and the public key of the initiating host, and the communication address information and the public key of the accepting host; and the second block is created by a second blockchain node in a manner of publishing a transaction including the data access authority and the public key of the initiating host, and the communication address information and the public key of the accepting host.

In one embodiment, the system further comprises:
one or more blockchain nodes;
the blockchain node is used for changing at least one of the following information by publishing the transaction when the blockchain account bound with the blockchain node has the information change authority, and when a preset change condition is satisfied:

the data access authority of the initiating host, the public key of the initiating host, the communication address information of the accepting host and the public key of the accepting host.

In the embodiment of the present disclosure, a plurality of AHs and IHs may be deployed in the communication system, and the AH may employ distributed deployment to jointly utilize the device information stored in the blockchain.

Figure 15:
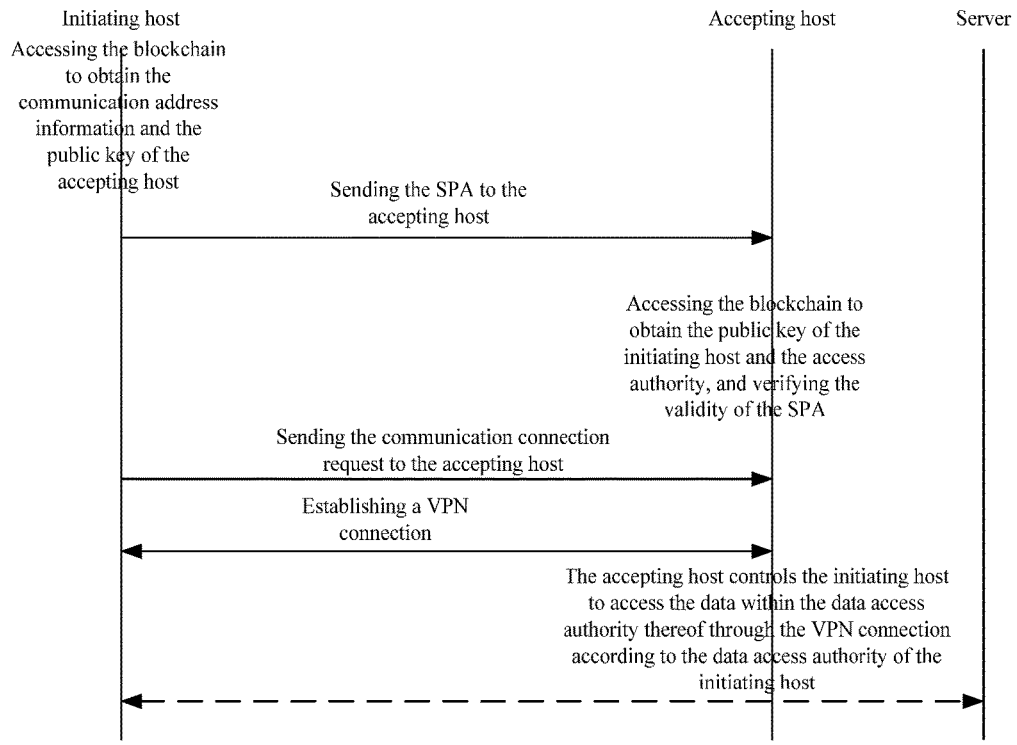
FIG. 15 is an interactive schematic diagram of initiating host and an accepting host in an embodiment of the present disclosure.

Referring to FIG. 15, according to the initiating host serving as the IH and the accepting host serving as the AH in the embodiment of the present disclosure, an SPA authentication process and a VPN connection establishment process are implemented by using the device information and the authority information stored in the blockchain, and the accepting host performs data access control by using the data access authority of the initiating host stored in the blockchain, the anti-risk and anti-attack capabilities of the communication system may be improved by the decentralized features and security features (for example, being unchangeable, unforgeable and fully traceable or the like) of the blockchain, and the communication security is improved. On the other hand, the process of the initiating host and the accepting host interacting with the controller to obtain device information, and registration, authentication and other processes are omitted, and the communication efficiency and performance of the device are improved.

Figure 16:
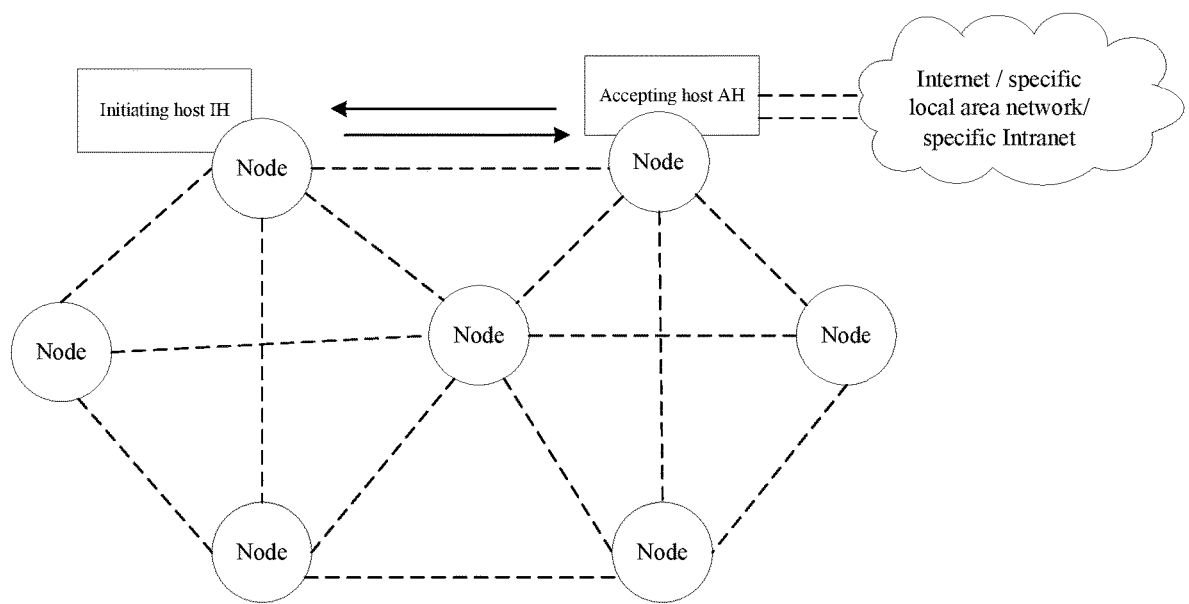
FIG. 16 is an application scene of an embodiment of the present disclosure.
Figure 17:
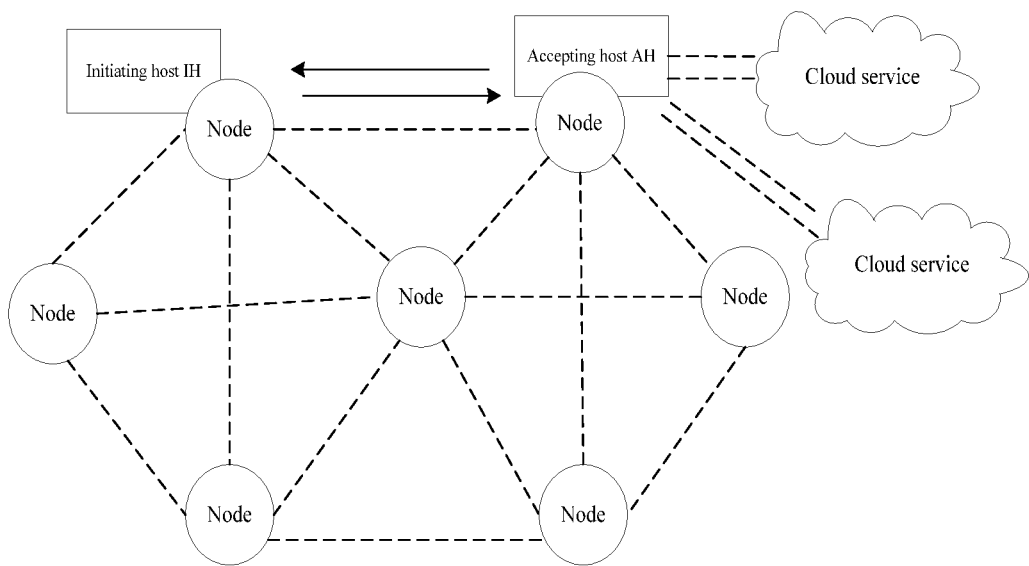
FIG. 17 is an application scene of another embodiment of the present disclosure.

Referring to FIG. 16 and FIG. 17, they are two application scenarios of the embodiment of the present disclosure. In FIG. 16, by adoption of the method of the embodiment of the present disclosure, in an Internet/specific local area network/specific intranet environment, the accepting host is deployed in front of the server that provides the data access and services to achieve the SDP and perform network access protection, thereby realizing the secure access of the data and the services. In FIG. 17, the accepting host is deployed in front of the server that provides the data access and services to perform cloud service access, thereby realizing the secure access of the data and the services.

The preferred embodiments of the present disclosure have been described in detail above in combination with the drawings. However, the present disclosure is not limited to the specific details in the above embodiments, various simple modifications may be made to the technical solutions of the present disclosure within the scope of the technical idea of the present disclosure, and these simple variations all fall within the protection scope of the present disclosure.

Any process or method described in other manners in the flowchart of the embodiment of the present disclosure may be understood as a module, a fragment or a portion that includes one or more executable instructions for implementing the steps of a particular logical function or process, and the scope of the embodiment of the present disclosure includes additional implementations, wherein the functions may be executed according to a basically simultaneous mode or an reverse sequence according to the involved functions without depending on the shown or discussed sequence, and this should be understood by those skilled in the art to which the embodiment of the present disclosure belongs.

In addition, it needs to be noted that the specific technical features described in the above specific embodiments may be combined in any suitable manner without contradiction. In order to avoid unnecessary repetition, the present disclosure does not further describe various possible combinations.

In addition, various different embodiments of the present disclosure may be randomly combined as long as they do not deviate from the idea of the present disclosure, and the combinations should also be regarded as the content disclosed by the present disclosure.

The invention claimed is:

1. A communication method, applied to an initiating host, comprising:
   determining an accepting host to be connected, wherein the accepting host is configured to be connected with a server that provides data access for providing data access protection for the server;
   obtaining a public key and communication address information of the accepting host from a blockchain;
   generating to-be-verified information according to the public key of the accepting host and a private key of the initiating host;
   sending the to-be-verified information to the accepting host according to the communication address information; and
   sending a communication connection request to the accepting host according to the communication address information to establish a communication connection with the accepting host, wherein the communication connection is used by the initiating host to obtain data within the data access authority of the initiating host from the data subjected to the data access protection from the server.

2. The method according to claim 1, wherein the step of generating the to-be-verified information according to the public key of the accepting host and the private key of the initiating host comprises:
   obtaining a first share secret according to the public key of the accepting host and the private key of the initiating host; and
   generating the to-be-verified information according to the first share secret.

3. The method according to claim 1, wherein the communication connection is a virtual private network VPN connection;
   the step of sending the communication connection request to the accepting host to establish the communication connection with the accepting host comprises:
   receiving a certificate sent by the accepting host after the verification is passed, wherein the certificate at least comprises the public key of the initiating host; and
   establishing the VPN connection with the accepting host by using the certificate.

4. The method according to claim 1, wherein the communication connection is a virtual private network VPN connection;
   the step of sending the communication connection request to the accepting host to establish the communication connection with the accepting host comprises:
   receiving a first random number sent by the accepting host after the to-be-verified information passes the verification;
   signing the received first random number by using the private key of the initiating host;
   sending a first signature result comprising the first random number to the accepting host, wherein the first signature result is used by the accepting host for performing de-signature verification on the same by using the public key of the initiating host obtained from the blockchain, wherein the de-signature verification represents to decrypt the first signature result using the public key of the initiating host and to compare the result of decrypt with the first random number in the first signature result;
   generating a second random number, and sending the second random number to the accepting host;

receiving a second signature result obtained by the accepting host by signing the second random number by using the private key of the initiating host;

performing de-signature verification on the second signature result by using the public key of the accepting host obtained from the blockchain; and when the de-signature verification of the second signature result is passed, and when the de-signature verification of the accepting host on the first signature result is passed, executing key negotiation to establish the VPN connection.

5. The method according to claim 1, wherein the step of obtaining the public key of the accepting host from the blockchain comprises:

determining whether a blockchain account bound with the initiating host has the authority of reading related information of the accepting host; and when the blockchain account has the authority of reading the related information of the accepting host, obtaining the public key of the accepting host from the blockchain.

6. A communication method, applied to an accepting host, wherein the accepting host is configured to be connected with a server that provides data access for providing data access protection for the server;

the method includes:

receiving to-be-verified information sent by an initiating host;

obtaining a public key of the initiating host from a blockchain;

verifying the to-be-verified information according to the public key of the initiating host and a private key of the accepting host; and after the to-be-verified information passes the verification, receiving a communication connection request sent by the initiating host to establish a communication connection with the initiating host; and controlling the initiating host to obtain data within the data access authority from the data subjected to the data access protection through the communication connection according to the data access authority of the initiating host stored in the blockchain.

7. The method according to claim 6, wherein the step of verifying the to-be-verified information according to the public key of the initiating host and the private key of the accepting host comprises:

obtaining a second share secret according to the private key of the accepting host and the public key of the initiating host;

verifying the to-be-verified information by using the second share secret, wherein the to-be-verified information is generated according to the first share secret, and the first share secret is obtained according to the public key of the accepting host and the private key of the initiating host; and when the second share secret is the same as the first share secret, indicating that the verification is passed.

8. The method according to claim 6, wherein the communication connection is a virtual private network VPN connection;

the step of receiving the communication connection request sent by the initiating host to establish the communication connection with the initiating host comprises:

after the verification is passed, generating a first certificate comprising the public key of the initiating host and a second certificate comprising the public key of the accepting host; and sending the first certificate to the initiating host, wherein the first certificate is used by the initiating host to prove its own identity when establishing the VPN connection with the accepting host, and the second certificate is used by the accepting host to prove its own identity when establishing the VPN connection with the initiating host.

9. The method according to claim 6, wherein the communication connection is a virtual private network VPN connection;

the step of receiving the communication connection request sent by the initiating host to establish the communication connection with the initiating host comprises:

after the to-be-verified information passes the verification, sending a first random number to the initiating host;

receiving a first signature result obtained by the initiating host by signing the first random number by using the private key of the accepting host;

performing de-signature verification on the first signature result by using the public key of the initiating host obtained from the blockchain, wherein the de-signature verification represents to decrypt the first signature result using the public key of the initiating host and to compare the result of decrypt with the first random number in the first signature result;

receiving a second random number sent by the initiating host;

signing the received second random number by using the private key of the accepting host;

sending a second signature result comprising the second random number to the initiating host, wherein the second signature result is used by the initiating host to perform the de-signature verification on the same by using the public key of the accepting host obtained from the blockchain; and when the de-signature verification of the first signature result is passed, and when the de-signature verification of the initiating host on the second signature result is passed, executing key negotiation to establish the VPN connection.

10. A non-transitory computer readable storage medium, comprising a computer program is stored thereon, the program implements the following steps when executed by a processor:

determining an accepting host to be connected, wherein the accepting host is configured to be connected with a server that provides data access for providing data access protection for the server;

obtaining a public key and communication address information of the accepting host from a blockchain;

generating to-be-verified information according to the public key of the accepting host and a private key of the initiating host;

sending the to-be-verified information to the accepting host according to the communication address information; and sending a communication connection request to the accepting host according to the communication address information to establish a communication connection with the accepting host, wherein the communication connection is used by the initiating host to obtain data within the data access authority of the initiating host from the data subjected to the data access protection from the server.

11. A non-transitory computer readable storage medium, comprising a computer program is stored thereon, the program implements the following steps when executed by a processor:

receiving to-be-verified information sent by an initiating host;

obtaining a public key of the initiating host from a blockchain;

verifying the to-be-verified information according to the public key of the initiating host and a private key of the accepting host; and after the to-be-verified information passes the verification, receiving a communication connection request sent by the initiating host to establish a communication connection with the initiating host; and controlling the initiating host to obtain data within the data access authority from the data subjected to the data access protection through the communication connection according to the data access authority of the initiating host stored in the blockchain.

* * * * *